United States Patent [19]
Hultgren et al.

[11] 3,981,694
[45] Sept. 21, 1976

[54] METHOD AND MEANS FOR AIR PURIFICATION DURING SPRAY-PAINTING

[75] Inventors: Lars Evert Hultgren, Huddinge; Olof Engwall, Lidingo, both of Sweden

[73] Assignee: Thermospray AG, Zug, Switzerland

[22] Filed: Sept. 4, 1974

[21] Appl. No.: 503,076

[30] Foreign Application Priority Data
Sept. 10, 1973  Sweden .............................. 7312306

[52] U.S. Cl. ...................................... 55/90; 55/229; 55/241; 261/112; 98/115 SB; 118/DIG. 7; 118/326
[51] Int. Cl.² .......................................... B01D 47/00
[58] Field of Search ............. 55/229, 240, 241, 422, 55/84, 89, 90, 257; 261/112; 98/115 SB; 118/326, 634, DIG. 7

[56] References Cited
UNITED STATES PATENTS

| | | | |
|---|---|---|---|
| 2,234,735 | 3/1941 | Lambert et al. ................... | 55/240 X |
| 2,266,335 | 12/1941 | Roche, Jr. et al. ............... | 98/115 SB |
| 2,382,026 | 8/1945 | Roche, Jr. ....................... | 261/112 |
| 2,527,139 | 10/1950 | Loney ............................. | 98/115 SB |
| 2,545,672 | 3/1951 | Pearson ........................... | 55/229 |
| 2,546,259 | 3/1951 | Fenn ............................... | 55/240 X |
| 2,883,170 | 4/1959 | Trittipoe .......................... | 261/112 |
| 3,018,847 | 1/1962 | Stanly ............................. | 55/241 |
| 3,119,675 | 1/1964 | Gallagher ......................... | 55/422 X |
| 3,390,400 | 6/1968 | Dock ............................... | 98/115 SB |

FOREIGN PATENTS OR APPLICATIONS

| | | | |
|---|---|---|---|
| 296,294 | 2/1954 | Switzerland ...................... | 98/115 SB |
| 1,231,710 | 5/1971 | United Kingdom ................. | 55/240 |

*Primary Examiner*—Frank W. Lutter
*Assistant Examiner*—David L. Lacey
*Attorney, Agent, or Firm*—Toren, McGeady and Stanger

[57] ABSTRACT

A spray-painting chamber comprises a vertical wall containing an upper opening and a lower opening. Means are provided to supply water to the top of said wall so as to produce a film of water running down the wall. Means are provided for sucking the paint mist from the spray-painting chamber through said openings. When passing through said openings the paint mist mixes with the water, resulting in the paint drops being absorbed by the water. Of the total water quantity 30–60% is drawn in by the paint mist through the upper opening. A tank is provided below said wall to receive the water-paint mixture. The paint separates from the water in said tank. The water is re-used by being pumped to the top of said wall.

10 Claims, 1 Drawing Figure

U.S. Patent  Sept. 21, 1976  3,981,694
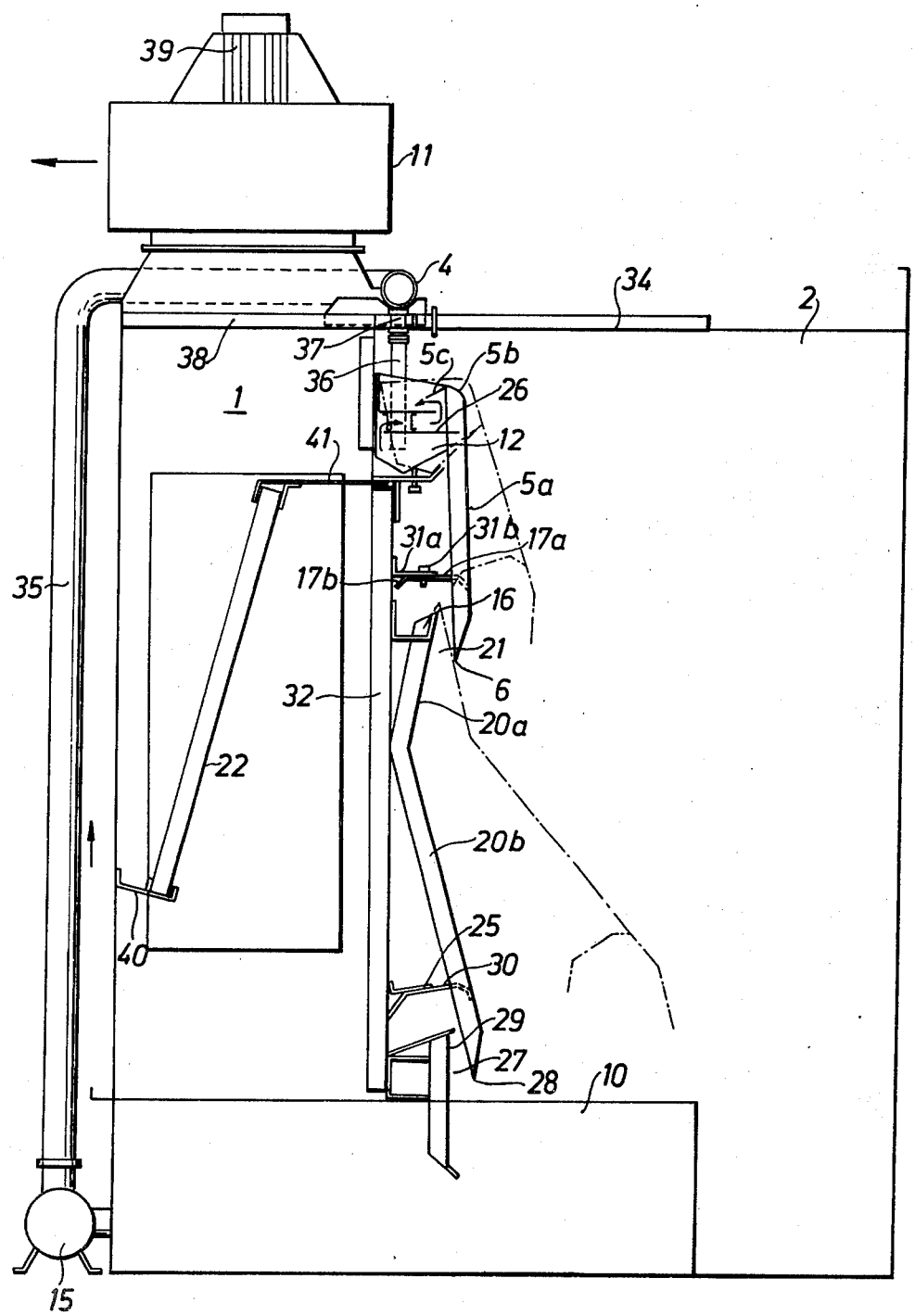

METHOD AND MEANS FOR AIR PURIFICATION DURING SPRAY-PAINTING

The invention relates to a method and means for air purification during spray-painting. The means is of the known type comprising an air-purifying chamber having a wall facing the chamber of spray-painting, several openings located at various levels in the wall, a fan to suck air from the chamber of spray-painting, through said openings and then on through the air-purifying chamber, and a means for pouring water over the side of the wall facing the chamber of spray-painting.

Spray-painting using a spray-painting box in which the filtering agent in the air-purifying unit is water has been known for many years. A member creating turbulence is provided to mix the painty air with the water in the unit under turbulent conditions. The mixture of water and air then passes through various labyrinth arrangements to separate the water which has by now taken up practically all the paint. Chemicals are preferably added to the water which break down the paint compound to ann easily manipulated material.

An air-purifying means of this known type is described in Swedish Pat. No. 354,202. In the known arrangement all the water flowing down along the wall is drawn in through the openings in the wall. Behind each opening is a means which separates the water from the air, and the separated water then runs out through the opening and flows over the part of the wall below the level of the opening.

Although this known arrangement functions extremely well with most types of paint, it has been found that certain types of paint cause problems since the separator for the water behind each opening becomes clogged after a while. The invention aims at eliminating this problem. The method according to the invention is characterised in that a film of water is caused to run down a substantially vertical wall provided with at least two openings located at different levels, that the paint mist is sucked through the openings with such a speed that only some of the water, suitably 30 – 60%, is drawn in with the paint mist and the rest continues to flow down along the wall, that the mixture of paint mist and water is forced to make at least one sharp alteration in direction in order to effect through mixing and atomization and that the speed of the mixture is then reduced so that water drops and paint particles which have been taken up are deposited. The air-purifying arrangement according to the invention is characterised in that openings are formed by a lower wall section and an upper wall section overlapping the lower wall section, so that some of the water running down over the upper wall section is drawn in through the opening, radically changing its direction and being atomized, while the rest of the water flowing down continues to the lower wall section.

It is important that the quantity of water is so great that only some of it, for example about 40%, is drawn in through an opening in the wall while the rest flows on to the next opening. In order to achieve this, the water which has collected in a basin at the bottom of the arrangement is pumped up to a water trough located at the top of the wall, from which the water flows out over the upper edge of the wall which thus acts as an overflow. The upper edge of the wall is suitably rounded. If the wall is made of sheet-metal, the upper part may be bent inwardly and down to a rounded shape so that the actual edge of the metal is lower than the highest point of the wall. The water then runs in a continuous film over the edge and down along the wall. In order to obtain a steady flow, it is advisable for the water trough to contain an insert which distributes the water uniformly along the entire length of the trough.

In the following the invention will be further explained with reference to the accompanying drawing showing an air-purifier for a spray-painting box. The means comprises a housing 34 containing an air-purifying chamber 1 and a paint-spraying chamber 2. A stand 32 supports a water trough 12 located at the top and extending along the entire length of the means. A first wall 5a is attached to the water trough, in the form of a metal sheet, the upper part 5b being bent to rounded shape so that the metal edge 5c projects obliquely down into the water trough. On the inside of the wall 5a, spaced from its lower edge 6, is a horizontal screen 17a having slightly downwardly bent edge sections 17b. One or more spacers 31a are adjustably secured to the screen 17a by means of screws 31b. The spacers abut the stand 32 and by adjusting the spacers 31a, the lower part 5a of the wall can be set at the desired distance from the stand 32. The water trough 12 contains a labyrinth insert 26 through which the water is forced to flow in the direction of the arrows in order to achieve a smooth flow. The water trough is pivotable so that the trough and the wall 5a can be swung out to the position shown in broken lines in order to facilitate cleaning the inside of the wall and the screen 17a.

A second wall 20a – b is also fitted on the stand. Its upper edge 16 is located inside and slightly higher than the lower edge 6 of the wall 5a so that a gap 21 is formed between the walls. The upper part 20a of the second wall slopes downwards and inwards towards the stand 32, whereas the lower part slopes downwards and outwards from the stand 32. At a distance from the lower edge 28 of the second wall is a screen 30 with adjustable spacers 25, as described in connection with the wall 5a. The second wall 20a – b can be swung out to the position shown in broken lines.

A third wall 29 is also fitted on the stand 32, the upper edge of which is located inside and higher than the lower edge 28 of the wall 20a – b so that a gap 27 is formed between the walls.

The means also includes a water basin 10 at the bottom of the housing 34. The basin extends below the air-purifying chamber 1 and some way in front of the wall 29. The basin communicates with a pump 15 which pumps water through a pipe 35 to a horizontal distributing tube 4 from which several vertical tubes 36 provided with valves 37 extended into the water trough 12.

In the roof of the air-purifying chamber 1 is an opening 38 to which a fan 11 is connected, which is driven by a motor 39. The air-purifying chamber 1 includes a drop catcher 22, mounted on two walls 40 and 41 so that it divides the chamber into two parts.

The means operates in the following manner: Water is pumped from the basin 10 to the water trough 12 and, thanks to the labyrinth 26 and the design of the upper part 5b, 5c of the first wall, flows in a uniform, copious and continuous flow down the wall 5a. A sub-pressure is maintained in the air-purifying chamber 1 by the fan 11 so that the paint mist formed in the paint-spraying chamber 2 is sucked at high speed in through the gaps 21, 27. Some of the water running down the first wall 5a will be sucked into the gap 21 together with the paint mist. The water first hits the upper part of the wall 20a and then the screen 17a and is directed by this screen obliquely downwards and inwards towards the lower part of the air-purifying chamber 1. Because of the changes in direction and the jolts against the walls, the water will be atomized and efficiently mixed with the paint mist and will take up the paint particles from the mist. Upon entering the air-purifying chamber 1, the speed of the air-water mixture will decrease and most of the water drops will be deposited in the basin 10. Remaining small drops of water will be caught by the drop catcher 22 and the clean air will be sucked out by the fan 11.

The water which is not drawn into the gap 21 falls obliquely down and hits the wall 20a, causing a certain amount of splash. Due to the slope of the wall 20a, most of the splash will land on the lower wall part 20b and only a small amount on the water surface in the basin 10. Some, possibly all, the water running down the wall 20b will be drawn into the gap 27 together with the paint mist. The water will hit the wall 29 and the screen 30, take up paint particles from the paint mist, and end up in the basin in the manner described above.

The air sucked out by the fan 11, the quantity of water circulating and the width of the gaps 21, 27 are adjusted so that maximum cleansing of the paint mist is obtained. It is suitable for 30 – 60% of the total quantity of water to be drawn in through the gaps 21, while almost all the remainder may be drawn in through the gap 27.

The water should contain chemicals, as is known, to facilitate the precipitation of the paint particles at the bottom of the basin 10.

Somewhat improved suction of the paint mist can be obtained if the wall between the chambers 1 and 2 is provided with several gaps. For most purposes, however, the embodiment shown is preferred, i.e. with two gaps 21, 27 extending horizontally across the entire length of the means, the upper gap 21 being approximately half way up the wall and the lower gap 27 being close to the basin 10.

What is claimed is:

1. A method of cleaning air from a spraying-painting chamber having a plurality of walls spaced apart to define therebetween at least one upper opening and one lower opening, through which air is drawn from the spray-painting chamber, the method comprising the steps of:
    a. providing a film of water to flow along said walls inside said spray-painting chamber from the top thereof;
    b. drawing air through said openings such that water is drawn therewith;
    c. for each opening causing the air-water mixture which is passed therethrough to make a first sharp alteration in direction upwards in order to effect thorough mixing and atomization, such that the water will take up paint particles from the air;
    d. for each opening causing the air-water mixture which is passed therethrough to make a second alteration in direction downwardly and into a cleaning chamber such that the speed of the air-water mixture is reduced and the water drawn in through the openings together with paint particles taken up are separated and deposited; and
    e. supplying water in a sufficient amount so as to provide said film such that at least at said upper opening only a portion of the water flowing down across the opening is drawn in therethrough, while the rest of the water flowing down across the opening continues to flow down along a wall of said plurality of walls below said upper opening.

2. A method according to claim 1, wherein between 30 –60% of the water flowing down across the upper opening is drawn in through said upper opening.

3. A method according to claim 1, wherein a major portion of said rest of the water is drawn in through said lower opening.

4. An air-cleaning arrangement for a spray-painting chamber, the arrangement comprising:
    a. an air-cleaning chamber having wall means which form a side of said spray-painting chamber, said wall means including at least an upper wall, a lower wall and a bottom wall, seen from the spray-painting chamber said upper wall overlapping and spaced from said lower wall and said lower wall overlapping and spaced from said bottom wall to define at least one upper gap-like opening and one lower gap-like opening in said wall means;
    b. fan means for drawing air from said spray-painting chamber through said openings into and through said air-cleaning chamber;
    c. means for supplying water on said wall means at a point above said upper opening on the side facing said spray-painting chamber, such that at said upper opening only a portion of the water flowing down across the opening from said upper wall is drawn in through the opening together with air and paint particles from the spray-painting chamber, said lower wall being arranged to receive the water flowing down along and leaving said upper wall such that at said lower opening at least a portion of the water leaving said upper wall is drawn in through said lower opening together with air and paint particles;
    d. a water basin at the bottom of said air-cleaning chamber; and
    e. means at each of said openings within said air-cleaning chamber for directing the air-water mixture drawn into and upwards through each gap-like opening downwards towards the lower part of the air-cleaning chamber and said water basin, thereby causing the speed of the air-water mixture to be reduced such that at least most of the water and paint particles taken up therein are deposited in said basin.

5. An arrangement according to claim 4, further including drop catcher means arranged to divide the air-cleaning chamber into an upper and a lower part, said fan being arranged to be in flow communication with the upper part.

6. An arrangement according to claim 4, wherein said lower wall includes an upper part to receive water from said upper wall which is inclined downwardly and inwardly towards the air-cleaning chamber, and a lower part which is inclined downwardly and outwardly from the air-cleaning chamber.

7. An arrangement according to claim 4, wherein said upper opening extends across said wall means substantially at the middle of said side of said spray-painting chamber and wherein said lower opening extends across said wall means substantially at the bottom of said side of said spray-painting chamber.

8. An arrangement according to claim 4, wherein said basin extends below said wall means into the spray-painting chamber at the bottom thereof.

9. An arrangement according to claim 4, wherein said water supplying means include a water trough at the top of said wall means, the upper edge of the upper wall being bent inwardly and downwardly toward said water trough.

10. An arrangement according to claim 9, further comprising pump means to supply said water trough with water from said basin.

* * * * *